Jan. 16, 1962        H. RUEGER        3,016,688
HAIRSPRING STUD
Filed Aug. 3, 1956
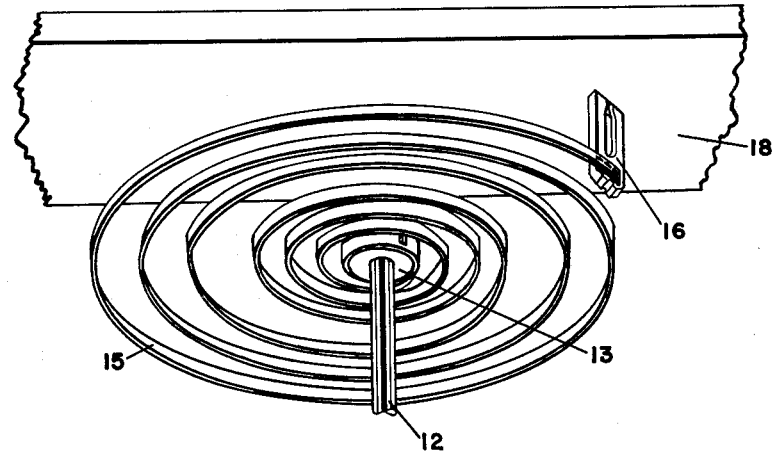
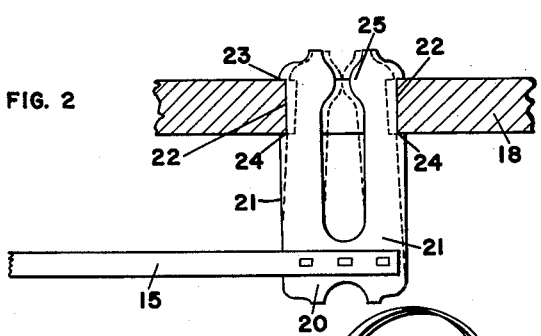
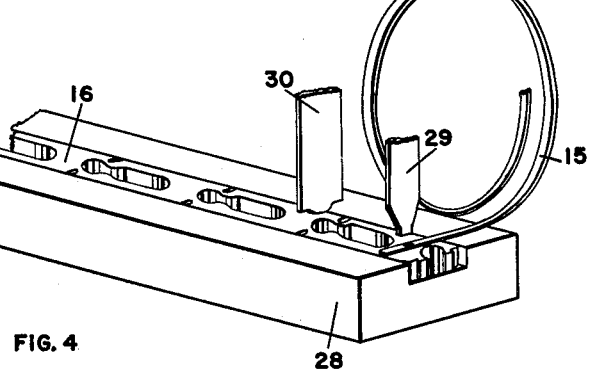
INVENTOR
Herman Rueger
BY  *M. W. Gould*
ATTORNEY 3,016,688
HAIRSPRING STUD
Herman Rueger, Lancaster Township, Lancaster County, Pa., assignor to Hamilton Watch Company, Lancaster, Pa., a corporation of Pennsylvania
Filed Aug. 3, 1956, Ser. No. 601,901
6 Claims. (Cl. 58—115)

This invention relates to a stud attached to the outermost end of the hairspring and provides a means for securing the hairspring to the balance cock.

The object of the present invention is to provide a stud for the outermost end of a watch hairspring which may be detachably secured to the balance cock, being removable and replaceable without defacement of any of the parts.

It is a further object of the present invention to provide a method of attaching the hairspring to the stud by means of spot welding to prevent distortion of the hairspring and to provide a method of attaching the hairspring to the stud which may be done automatically and with precision. The use of two or more welds greatly strengthens the joint against torque loosening.

It is a still further object of the present invention to provide a hairspring stud which may be detachably connected to the balance cock in such a manner that its removal may be accomplished without the use of special tools, and its replacement done in like manner without injury to any parts.

It is a still further object of the present invention to provide a stud for hairsprings which may be welded to one end of the hairspring so that the hairspring is held in a flat condition against the stud, said stud being inherently resilient so that it may be sprung into position in the balance cock, the inherent resiliency of the stud holding it rigid within a specially designed opening in the balance cock.

The invention is shown in the accompanying drawings in which:

FIGURE 1 is a perspective view of the balance staff showing the hairspring, balance cock and stud from below.

FIGURE 2 is a cross section through the balance cock showing the stud in position.

FIGURE 3 is a top plan view of three of the studs in a strip, actual size.

FIGURE 4 is a perspective view showing the method of attaching the hairspring to the stud.

Referring particularly to the drawings, a balance staff 12 carries a collet 13 to which the inner end of a hairspring 15 is attached. The outermost end of the hairspring 15 is secured to a stud 16 which is detachably connected to the balance cock 18.

The formation of the stud provides a substantially U-shaped body having a base 20, upstanding U-shaped arms 21, which are sufficiently resilient so that they may be bent inward to the position shown in dotted lines in FIGURE 2 and will naturally upon the release of the pressure spring outward. At the upper outside portion of the U-shaped arms, recesses 22, having upper and lower shoulders 23 and 24 are adapted to fit the edge of the balance cock 18 very exactly. In order to provide strength in the stud and to serve as a stop to prevent too great a degree of bending of the U-shaped arms, a semicircular projection 25 is formed on the inward side of the U-shaped arms adjacent the upper end. These projections abut to prevent distortion of the stud, but allow the U-shaped arms to be brought together sufficiently to permit withdrawal through the opening in the balance cock.

The stud 16 is secured to the outermost end of the hairspring by spot welding, the method being shown diagrammatically in FIGURE 4. A series of studs 16 in strip form for simplified handling, as shown in FIGURE 4, slide in a rest 28 and are presented under a spot welding electrode 29 and a cutter 30. The hairspring is positioned across the top of the stud and spot welding electrode 29 is brought into contact sufficient to weld the hairspring to the stud in several places (depending upon the shape of the electrode and the positioning of the rest). This provides a flat contact between the stud and the hairspring which will not distort the hairspring, nor endanger the joint when torque is applied during assembly or in spring operation. It is customary at the present time to pin the hairspring into a round hole with a round pin which distorts the hairspring slightly, causing it to flex more easily in one direction than in the other. This does have a slight effect on the timekeeping and the present method would furnish a slight improvement in this respect. The shoulders on the arms limit the insertion distance, assuring repeated uniform stud lengths depending from the balance bridges.

A cutting blade 30 is adapted to sever the studs after the welding operation has taken place so that they may be removed from the rest 28 after their attachment to the hairspring 15. The area adjacent to projections 25 is thinned and thereby serves to permit ready parting without distorting the stronger U-shaped members, so that during the cutting operation the stud is not distorted.

The strip permits simplified handling, feeding and positioning for spot welding. The strip, being flat, will not turn during the application of welding pressure, thus assuring better welds than possible with other than flat shapes. Any incident heat imparted by the welding does not affect the resilience of the arms of the U-shaped studs. The flat strip material can be fed automatically through the stamping dies which cut out the stud shapes, no further operations being required thereafter (economical manufacture). End to end or side by side positioning may be used in the strip. Studs of steel alloy will readily spot weld to springs, the metals being strongly joined in the process. The springing of the arms will not affect the joint at the welds. The welding fixture assures uniform spring positioning.

What is claimed is:

1. A watch containing a hairspring attached at one end to a balance staff-carried collet; a hairspring stud comprising a substantially U-shaped member having a base and two resilient arms extending from said base; the base of said stud being bonded to the other end of said hairspring; and a balance cock having an aperture in which the resilient arms of said stud are received and retained in interlocking frictional relationship.

2. A watch containing a hairspring attached at one end to a balance staff-carried collet; a hairspring stud comprising a substantially U-shaped member having a base and two resilient arms extending from said base; said stud being substantially flat in a plane passing through said base and said arms; the base of said stud being bonded to the other end of said hairspring; and a balance cock having an aperture in which the resilient arms of said stud are received and retained in interlocking frictional relationship.

3. A watch as defined in claim 2 wherein said other end of said hairspring is welded to the flat surface of said base.

4. A watch as defined in claim 2 wherein said arms are substantially parallel to one another both in their normal, unstressed position and after being received and retained in the aperture in said balance cock.

5. A watch as defined in claim 2 wherein said arms have notches on their outer sides, each of said notches being bounded by a base and two side walls; the side wall of said aperture and the top and bottom surfaces of said balance cock immediately adjacent said aperture being respectively in substantially flush engagement with the base and side walls bounding each of said notches.

6. A watch as defined in claim 5 wherein said arms are provided with projections on their inner sides near their free ends to prevent permanent distortion of the arms while permitting said arms to be flexed towards one another sufficiently to permit said arms to be inserted into and withdrawn from said aperture.

References Cited in the file of this patent

UNITED STATES PATENTS

| | | |
|---|---|---|
| 1,037,741 | Dudley | Sept. 3, 1912 |
| 2,058,733 | Smith | Oct. 27, 1936 |
| 2,047,188 | Bechler | July 14, 1936 |
| 2,065,843 | Van Uum | Dec. 29, 1936 |
| 2,379,780 | Bennett et al. | July 3, 1945 |
| 2,778,097 | Berg | Jan. 22, 1957 |
| 2,832,408 | Manning | Apr. 29, 1958 |
| 2,846,760 | Rohn | Aug. 12, 1958 |

FOREIGN PATENTS

| | | |
|---|---|---|
| 264,668 | Switzerland | Jan. 16, 1950 |
| 304,439 | Switzerland | Mar. 16, 1955 |